Patented July 21, 1931

1,815,735

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

CRYSTALLIZATION PROCESS

No Drawing. Application filed March 24, 1928. Serial No. 264,572.

The technology of crystallization has during recent years been given increasing study and consideration as set forth, for example, in the paper by Hugh Griffiths entitled, "Recent developments in technical methods", which appeared in Chemical Trade Journal and Chemical Engineer LXXV, 486 (October 24, 1924), and other published articles of a similar nature. While various methods have been disclosed, or at least discussed, for obtaining so-called controlled crystallization, such as is necessary for the manufacture of individual crystals of even size and regular shape, so far as I am aware, no particular success has heretofore been achieved in this regard with the use of evaporative cooling.

However, I have now discovered that the production of many anhydrous and hydrated salts in desirable crystalline form may be easily and economically accomplished by vacuum cooling, conditioned upon the observance of proper operative conditions and precautions. As a result a product may be obtained that is unique in the perfection of the crystals and the uniformity of their size.

To the accomplishment of the foregoing and related ends, the invention, then, consists of the steps hereinafter fully described and particularly pointed out in the claims, the following description setting forth but several of the various ways in which the principle of the invention may be utilized.

Crystallization by vacuum cooling is applicable for the crystallization of any substance if a solution saturated with such substance has sufficiently high vapor pressure so that it can be boiled by the application of commercial vacuums, for example from one inch absolute pressure up.

Accordingly the present process is applicable to the crystallization of many salts such as Epsom salts or magnesium sulphate hepta-hydrate, $(MgSO_4.7H_2O)$, potassium bromide, $(KBr)$, sodium bromide, $(NaBr)$, and strontium bromide hexahydrate, $(SrBr_2.6H_2O)$.

For the purpose of illustration the crystallization of Epsom salts in accordance with the present improved process will now be described in some detail. Crystals of this salt produced in a salting out vacuum evaporator of the usual type with mechanical circulation, may be made quite large, but they will be of a stubby needle form instead of a relatively long needle crystal which characterizes the perfectly crystallized product and which is preferred by the pharmaceutical trade.

The transition point for the reaction

is a temperature of 48° C. and $MgSO_4.7H_2O$ is the solid phase in equilibrium with a saturated $MgSO_4-H_2O$ solution throughout the temperature range 2.0° C. to 48° C. From 48° C. to 68° C. $MgSO_4.6H_2O$ is the solid phase in eqiulibrium with saturated

solutions.

$MgSO_4.7H_2O$ belongs to the orthohombic crystal system and normally salts out as needle crystals while $MgSO_4.6H_2O$ belongs to the monoclinic crystal system and normally salts out as granular crystals. It has been found that the first $MgSO_4.7H_2O$ crystals salted out in the present process should not occur at a temperature too close to the $MgSO_4.7H_2O \rightleftharpoons MgSO_4.6H_2O+H_2O$ transition temperature in order to avoid possibility of the batch first becoming seeded with $MgSO_4.6H_2O$ and so obtain granular crystals instead of the desired needle crystals. For the above reasons 42° C. is selected as the temperature at which the first crystals should appear and by so operating, no difficulty is encountered in always obtaining needle crystals.

The vacuum crystallization of such Epsom salts by the present process is preferably carried out in a tank of general cylindrical form provided with a stirrer, e. g. a gate type or paddle type stirrer, which, supplemented by spiral or inclined baffles on the side walls serves, where desired, to induce a flow of the contents of the tank, up along such side walls to the surface and thereby keep the crystals in suspension with a minimum of attrition on each other and the walls of the container.

However, only very gentle agitation is employed in the process and preferably only in the second stage thereof, the object being to maintain the suspension of the growing crystals in a solution, or mother liquor, with as little erosion as possible, so that the crystals may be free to grow in any direction under the natural crystallization forces and in proportion to them.

The solution of substantially pure magnesium sulphate ($MgSO_4 \cdot H_2O$) at 70° C. and 38.5° Bé. is loaded into the crystallizer tank, a depth of approximately four feet in the case of a tank having a diameter of 10 feet being found satisfactory in practice. This temperature and gravity is not important at this point, but is merely convenient in the operation of the process, as will be shown later. Any crystals remaining in the crystallizer from a previous batch are removed prior to loading the crystallizer by washing either with water or weak mother liquor. Thus after loading said crystallizer, we have a $MgSO_4$ solution preferably entirely free of crystals. With the agitator not running vacuum is now applied and the solution is cooled by vacuum evaporation to a temperature at which a few needle crystals appear in the solution. For best operation, this temperature should not be above approximately 42° C. If the feed liquor gravity is adjusted to approximately that indicated above, it has been found that the first needle crystals appear in the solution when cooled to 42° C. by vacuum evaporation; and when the first definite needle crystals appear, (as evidenced in an external sight glass through which the solution circulates), the vacuum is cut and the solution stops boiling.

Under the conditions described, the supersaturated solution of the heptahydrate salt thereby produced is caused to deposit a relatively small amount of medium-large crystals which are quite uniform in size and regular in shape and which act as center or nuclei for further crystal growth. Due to the negative heat of solution of the salt the temperature of the solution rises 1.5° C. to 2.0° C., depending on the degree of supersaturation, and when the supersaturation of the solution has been removed, as indicated when the temperature ceases to rise the agitator is started and the vacuum increased to produce boiling at a moderate rate. The vacuum is gradually increased as the solution cools, so as to maintain a uniform gradual rate of cooling. As the solution cools a hot solution of magnesium sulphate liquor of the same strength or stronger than the original solution may be fed in at the bottom of the crystallizer and so obtain a larger production of crystals than can be obtained by straight batch operation.

When the contents of the crystallizer have been cooled as low as practical, the whole batch is dumped into a crystal slurry storage tank, the crystallizer rinsed out and reloaded, and the cycle repeated. The crystal slurry is separated into mother liquor and Epsom salt crystals containing a small amount of moisture in a centrifuge or rotary suction filter, and the crystals are then dried with hot air in a rotary drier, screened and packaged. The mother liquor may either be concentrated to 38.5° Bé. at 70° C. and used as feed liquor for the next batch of crystals, or the gravity may be brought to the indicated gravity by the addition of heat and substantially pure Epsom salts from another source.

Many other salts may be crystallized by a similar procedure to that just described in detail, to obtain substantially perfect crystals of uniform size by controlled vacuum cooling of their hot, suitably concentrated crystal free solutions to produce a supersaturated solution with respect to the desired salt or salt hydrate, followed by interruption of said vacuum cooling until said supersaturation has been removed in forming a preliminary crop of crystals and then continuing the vacuum cooling at a uniform moderate rate with gentle agitation of the crystal slurry to as low a temperature as is obtainable by vacuum cooling, or to just short of the next lower transition temperature, whereby further crystallization occurs accompanied by crystal growth upon the first crystals as nuclei.

In conclusion it may be noted that the batch may be cooled, crystallization started, continued and dumped without addition of more solution thereto, but a larger batch of crystals of excellent quality may preferably be obtained by proceeding as described.

Other modes of applying the principle of the invention may be employed instead of the one explained, change being made as regards the method herein disclosed, provided the step or steps stated by any of the following claims or the equivalent of such stated step by steps be employed.

I therefore particularly point out and distinctly claim as my invention:—

1. The process of producing uniform crystals of a salt which comprises preparing a hot, crystal-free solution thereof, vacuum-cooling such solution to produce a condition of supersaturation until crystals form spontaneously therein, interrupting such cooling until the degree of supersaturation is materially reduced, and then subjecting the solution to further vacuum-cooling with moderate agitation to induce continued crystal growth upon said first crystals as nuclei.

2. The process of producing uniform crystals of a salt which comprises preparing a hot, crystal-free solution thereof, partially cooling such solution by self-evaporation in a vacuum until crystals begin to form therein, releasing the vacuum and allowing the solution to stand until substantially no more crystals are formed, whereby a minor proportion only of the dissolved salt is crystallized out, and then subjecting such solution to a gradually increasing vacuum with moderate agitation to cool the same further until the temperature thereof falls below the boiling point of the solution at the vacuum employed, whereby continued crystal growth takes place upon said first crystals as nuclei.

3. The process of producing uniform crystals of a salt which comprises preparing a hot, crystal-free solution thereof, partially cooling such solution by self-evaporation in a vacuum until crystals begin to form therein, releasing the vacuum and allowing the solution to stand until substantially no more crystals are formed, whereby a minor proportion only of the dissolved salt is crystallized out, and then subjecting such solution to a gradually increasing vacuum with moderate agitation to cool the same further while adding thereto more of a solution capable of producing crystals of said salt therein, whereby continued crystal growth takes place upon said first crystals as nuclei.

4. In a process for crystallizing Epsom salts from a solution thereof, the steps which consist in cooling such solution by evaporation, without seeding, by reducing pressure thereon until crystals start to form, and then raising pressure on the solution sufficiently to stop boiling thereof.

5. In a process for crystallizing Epsom salts from a solution thereof, the step which consists in vacuum cooling such solution to a point of supersaturation where crystals of the heptahydrate salt form without seeding and grow rapidly, such solution being initially free from crystals.

6. In a process for crystallizing Epsom salts from a solution thereof, the step which consists in vacuum cooling such a solution having a density of approximately 38.5° Bé. at 70° C. and substantially free from crystals to a point of supersaturation where crystals of the heptahydrate salt form without seeding and grow rapidly.

7. In a process for crystallizing Epsom salts from a solution thereof, the step which consists in vacuum cooling such a solution having a density of approximately 38.5° Bé. at 70° C. and substantially free from crystals to a temperature of approximately 42° C.

8. In a process for crystallizing Epsom salts from a solution thereof, the steps which consist in vacuum cooling such a solution having a density of approximately 38.5° Bé. at 70° C. and substantially free from crystals to a point of supersaturation where crystals of the heptahydrate salt form without seeding and grow rapidly and thereupon interrupting such cooling.

9. In a process for crystallizing Epsom salts from a solution thereof, the steps which consist in vacuum cooling such a solution having a density of approximately 38.5° Bé. at 70° C. and substantially free from crystals to a temperature of approximately 42° C., thereupon interrupting such cooling until the degree of supersaturation of the solution is materially reduced, and then subjecting such solution to further vacuum cooling.

10. In a process for crystallizing Epsom salts from a solution thereof, the steps which consist in vacuum cooling such a solution having a density of approximately 38.5° Bé. at 70° C. and substantially free from crystals to a temperature of approximately 42° C., thereupon interrupting such cooling until the degree of supersaturation of the solution is materially reduced, and then subjecting such solution to a gradually increasing vacuum as the solution cools.

11. In a process for crystallizing Epsom salts from a solution thereof, the steps which consist in vacuum cooling such a solution having a density of approximately 38.5° Bé. at 70° C. and substantially free from crystals to a temperature of approximately 42° C., thereupon interrupting such cooling until the degree of supersaturation of the solution is materially reduced, and then subjecting such solution to further vacuum cooling, and simultaneously agitating the same.

12. In a process for crystallizing Epsom salts from a solution thereof, the steps which consist in vacuum cooling such a solution having a density of approximately 38.5° Bé. at 70° C. and substantially free from crystals to a temperature of approximately 42° C., interrupting such cooling until the temperature rise due to crystal formation substantially ceases, and then subjecting such solution to further vacuum cooling and simultaneously agitating the same.

13. In a process for crystallizing Epsom salts from a solution thereof, the steps which consist in vacuum cooling such a solution having a density of approximately 38.5° Bé. at 70° C. and substantially free from crystals to a temperature of approximately 42° C., interrupting such cooling until the temperature rise due to crystal formation substantially ceases, and then subjecting such solution to further vacuum cooling and at the same time adding thereto more solution capable of producing crystals therein.

Signed by me this 20th day of March, 1928.

SHELDON B. HEATH.